Patented Oct. 18, 1932

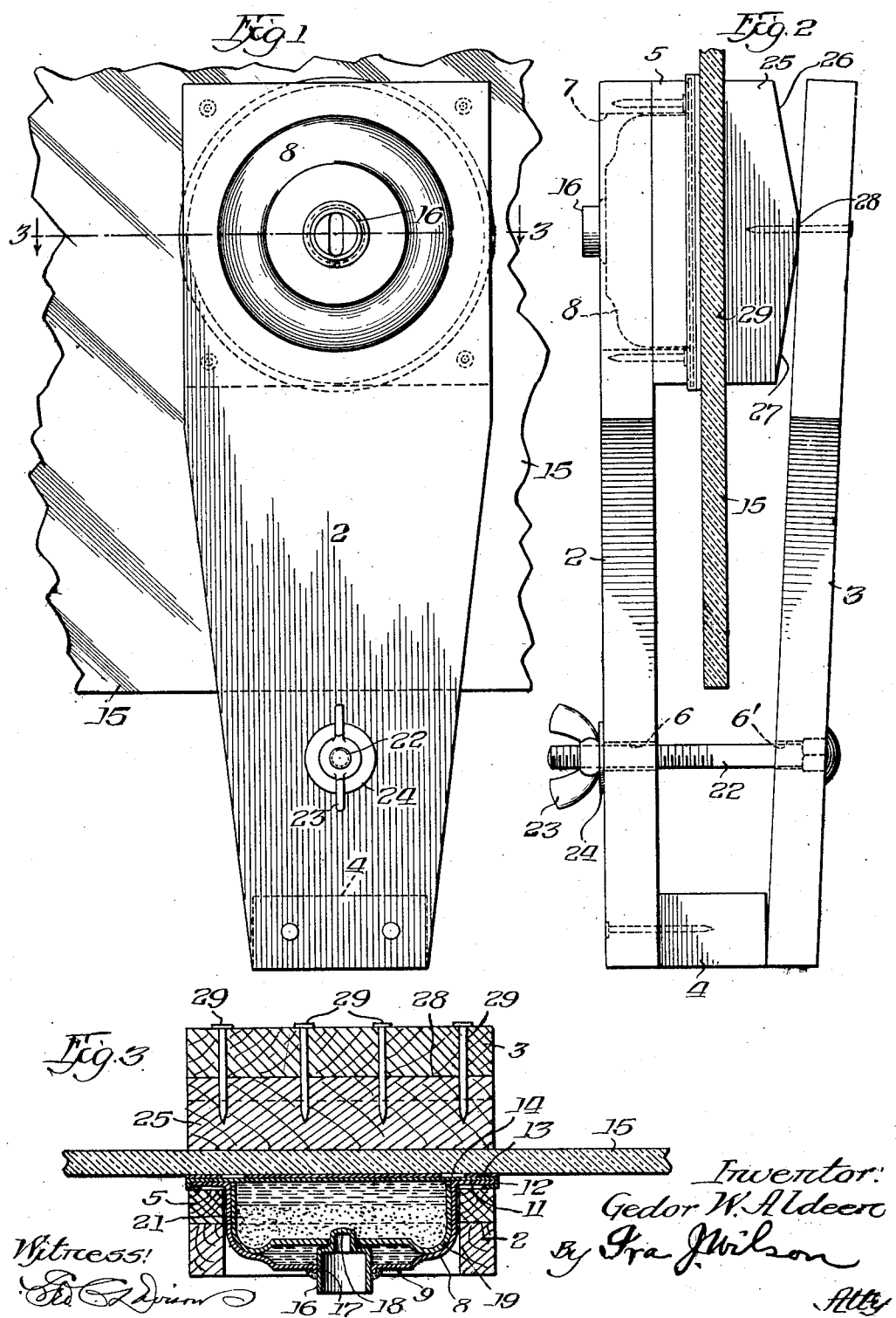

1,883,445

UNITED STATES PATENT OFFICE

GEDOR W. ALDEEN, OF ROCKFORD, ILLINOIS, ASSIGNOR TO FYRAC MANUFACTURING COMPANY, OF ROCKFORD, ILLINOIS, A CORPORATION OF ILLINOIS

HOLDER FOR GLASS CUTTER CARTRIDGES

Application filed March 5, 1928, Serial No. 259,335. Renewed February 23, 1932.

This invention pertains to apparatus for cutting holes in glass or other material, although primarily adapted for cutting holes through the glass windshields and the like of automobiles for the reception and mounting of windshield spotlights, such as those, for instance, disclosed in Patent No. 1,501,704, dated July 15, 1924.

The primary purpose and object of the invention is to provide an inexpensive glass cutting apparatus adapted to receive and hold a glass cutter cartridge, such as that described and claimed in my copending application Serial No. 54,171 entitled Glass cutter, and assigned to the assignee of the present application.

Other objects, the advantages, uses and purposes of the invention, as well as the functions of the preferred form illustrated, will be or should become readily appreciated after reading the following description and claims, and after viewing the drawing, in which:

Fig. 1 is a plan view of one side of a glass cutting apparatus showing it in position for cutting a hole through a piece of glass, Fig. 2 is a side elevational view of the same, and Fig. 3 is a sectional view taken on the line 3—3 of Fig. 1.

The glass cutting apparatus comprises primarily a pair of wood boards 2 and 3 of similar shape and configuration, although this is more or less immaterial. The board 2 at one end has a limit or abutment block 4 nailed or otherwise secured thereto and at its other end on the same side may be provided with a block 5 which likewise is secured by nails or other means, while intermediate the blocks 4 and 5 and adjacent the end to which the block 4 is attached, it is provided with a hole 6 for a purpose to be described. The opposite end, the end to which the block 5 is secured, and the block 5, are bored through, as shown at 7, to provide a round opening or recess adapted to snugly receive a glass cutter cartridge.

The glass cutter cartridge 8 is fully described and claimed in the copending application aforesaid and will be briefly described herein. It comprises in general a thin metal shell portion of cup-shape, designated 9, having an outwardly projecting circumferential flange 11 about which a thin metallic diaphragm 12 is secured in water tight relation. The diaphragm 12 is preferably composed of very thin soft penetrable material, such as sheet brass, and is equipped on its glass contacting face with a paper fiber or other suitable material gasket 13 having cut away portions 14 for the purpose of reducing the amount of material to be cut through before the cutter reaches the surface of the glass 15.

The gasket 13 is preferably composed of heavy oiled paper having a degree of compressibility in order to form a water tight connection between the cartridge and the glass and is secured to the diaphragm with waterproof cement or glue, or in any other desirable manner. Before the cartridge is sealed with the diaphragm 12, a nipple 16 formed of brass or other suitable metal or material is tightly but revolubly inserted in a flanged opening 17 formed centrally in the back of the cartridge shell 9. This nipple is provided with an elongated depressed portion 18 adapted to be engaged by a similarly shaped tool and to be driven thereby for the purpose of driving, i. e., rotating, a cutter 19 rotatably mounted in and sealed within the cartridee. Water and abrasive material 21 are also sealed within the cartridge so that when the cutter 19 is rotated, first the diaphragm 12, then the gasket 13 and then the glass 12 will be cut through.

The other board 3 is also provided with an opening 6' for the reception of a bolt 22 which passes therethrough and through the opening 6 in the opposite board 2. A wing or other nut 23, between which and the board 2 a washer 24 may be placed, is threadedly engaged with the threads of the bolt 22 and serves to draw the boards 2 and 3 toward one another. At its opposite end the board 3 is connected to an abutment or clamp block 25 by a rocking or pivotal connection. This connection is provided by planing off the wood block 25, as shown at 26 and 27, to provide more or less of a knife edge or a rocker line 28 along which nails 29 or other securing means pass through the board 3 into the block 25. This rocker or pivotal connection permits the surface 29 of the block 25 to conform to the surface of the glass opposite the surface against which the cutter is disposed regardless of the positions of the blocks 2 and 3 relative to one another.

In operation when a piece of glass is to be cut the wing nut 23 is unscrewed to permit the insertion of a cartridge 8 in the block or plate 2 and to permit passage of the piece of glass 15 between the gasket face of the cartridge and the abutment face 29 of the block 25. When the blocks or plates 2 and 3 with the cartridge are in position over the portion of the glass through which the opening is to be cut with the blocks 2 and 3 substantially registering with one another on opposite sides of the glass, the wing nut 23 is tightened and by reason of the abutment block 4 the cartridge and the clamp pad or block 25 are tightly clamped against opposite sides of the glass. Upon insertion of a suitable tool in the nipple 16, rotation of the tool will cause rotation of the cutter blade which will cut through the diaphragm 12 and gasket 13 and then through the glass 15.

The cutter made in accordance with the invention may be constructed very cheaply, both as regards labor and material, and when worn out or broken may be discarded and replaced at little or no substantial cost. Many other advantages could be specified, but it is believed that they, together with the uses of the invention, will be clearly understood and appreciated from the foregoing description. However, while I have described and illustrated what is at present a preferred form of the invention, it should be understood and appreciated that because many variations, modifications and changes may be made therein, I do not wish to be limited thereto but only by the spirit of the invention and the scope of the appended claims.

I claim:

1. A glass cutting device comprising, a pair of members adapted to be disposed on opposite sides of a piece of glass and to extend substantially parallel with one another in cutting positions, means for connecting said members adjacent one end of each and for drawing them together, means between said connecting means and said member ends for limiting relative movements of said ends toward one another, one of said members adjacent its opposite end having an aperture therethrough adapted to receive a glass cutter cartridge, and means secured to the opposite end of the other member for abutting against the glass opposite the said cartridge.

2. A glass cutting device comprising, a pair of members adapted to be disposed on opposite sides of a piece of glass, means adjustably connecting said members for drawing them together, one member having a recess in the opposite end thereof adapted to receive and hold a glass cutter cartridge, and means secured to the opposite end of the other member for contacting with the surface of the glass opposite the cartridge.

3. A glass cutting device comprising, a pair of wood boards, means adjustably connecting said boards for drawing them relatively toward one another, one of said boards having a substantially circular opening therethrough adjacent its opposite end for receiving a glass cutter cartridge, and a block connected to the other board adjacent its opposite end for contacting with the surface of the glass opposite the cartridge.

4. A device for holding a glass cutter cartridge of the type which includes a cup shaped casing housing a rotatable tubular cutter and abrasive material, in cooperative relation with a glass plate to be cut, comprising a pair of clamp members to embrace a glass plate to be cut, a spacing fulcrum between corresponding ends of the clamp members, one of said members having a cartridge receiving seat opening through the inner and outer faces of the member, a self-aligning abutment carried by the inner face of the other clamp member in alignment with the cartridge seat, and means to rock the clamp members on the fulcrum to draw the clamp members together for clamping the glass plate to be cut between the abutment and the seat portion of the opposite clamp member.

5. A device for holding a glass cutter cartridge of the type which includes a cup-shaped casing housing, a rotatable tubular cutter and abrasive material, in cooperative relation with the glass plate to be cut, comprising a pair of clamp members to embrace a glass plate to be cut, a spacing fulcrum between corresponding ends of the clamp members, one of said clamp members having a cartridge receiving seat opening through the inner and outer faces of the member, a self-aligning abutment carried by the inner face of the other clamp member in alignment with the cartridge seat, a bolt carried by one of the clamp members and extending through an opening in the opposite member, and a nut on the projecting end of the bolt for drawing the members together to clamp a glass plate to be cut between the abutment and the seat portion of the opposite clamp member.

6. A device for holding a glass cutter cartridge of the type which includes a cup shaped casing housing, a rotatable tubular cutter and abrasive material, in cooperative relation with the glass plate to be cut, comprising a pair of clamp members to embrace a glass plate to be cut, a spacing fulcrum between corresponding ends of the clamp members, one of said members having a cartridge receiving seat opening through the inner and outer faces of the member, a self-aligning abutment carried by the inner face of the other clamp member in alignment with the cartridge seat, said abutment having its rear face beveled inwardly from opposite edges and provided with a rocker surface between the inner edge portions of the beveled portions, a rocking connection between the rocker portion of the abutment and the adjacent clamp member, and means adjacent the fulcrum for drawing the clamp members together thereon to clamp a glass plate to be cut between the abutment and the seat portion of the opposite clamp member.

7. A glass cutting device comprising a pair of members adapted to be disposed upon opposite sides of a piece of glass in substantially parallel relation, means for pivotally connecting said members together adjacent one end thereof, means for drawing said members together about said pivoted ends to cause the members to clamp a piece of glass therebetween, one of said members having an aperture therethrough adjacent its opposite end adapted to receive a glass cutter cartridge.

In witness of the foregoing I affix my signature.

GEDOR W. ALDEEN.